United States Patent [19]
Aitken

[11] 3,952,214
[45] Apr. 20, 1976

[54] ELECTROSTATIC GENERATORS
[75] Inventor: Thomas Wilson Aitken, Warrington, England
[73] Assignee: Science Research Council, England
[22] Filed: May 12, 1975
[21] Appl. No.: 576,647

[30] Foreign Application Priority Data
May 21, 1974 United Kingdom............... 22739/74

[52] U.S. Cl. .................................. 310/6
[51] Int. Cl.² .......................................... H02N 1/00
[58] Field of Search.......................... 310/5, 6, 10

[56] References Cited
UNITED STATES PATENTS
3,529,185   9/1970   Isoya et al................................ 310/6
3,612,918  10/1971   Willutski................................. 310/6
3,842,293  10/1974   Allen et al. ............................ 310/6

Primary Examiner—Donovan F. Duggan
Attorney, Agent, or Firm—Larson, Taylor and Hinds

[57] ABSTRACT

An electrostatic generator comprises a series of smooth uncovered electrically conductive elements which are interconnected mechanically by links so as to form an endless chain for carrying charge to a high voltage terminal. Electrical insulation by which each of the elements is insulated from its neighbours is arranged to be stressed in compression so as to take advantage of the better compressive properties generally exhibited by appropriate insulating materials. The elements may be elongated and arranged transversely of the travel of the chain, such that the chain resembles a caterpillar track.

8 Claims, 3 Drawing Figures

U.S. Patent April 20, 1976 3,952,214
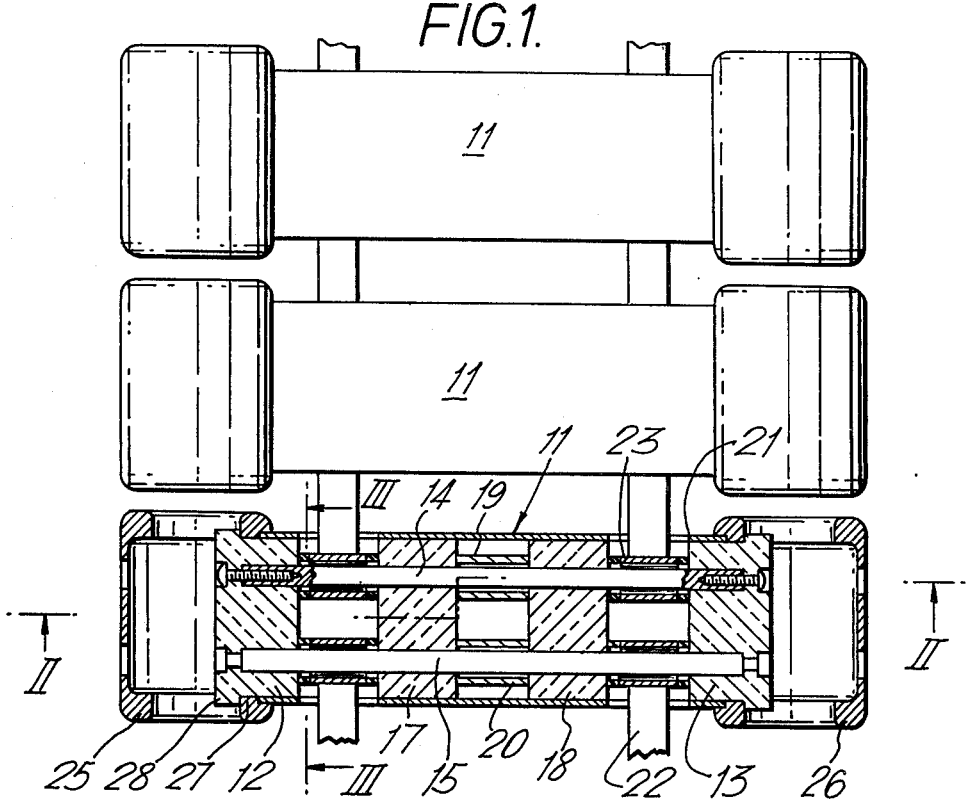
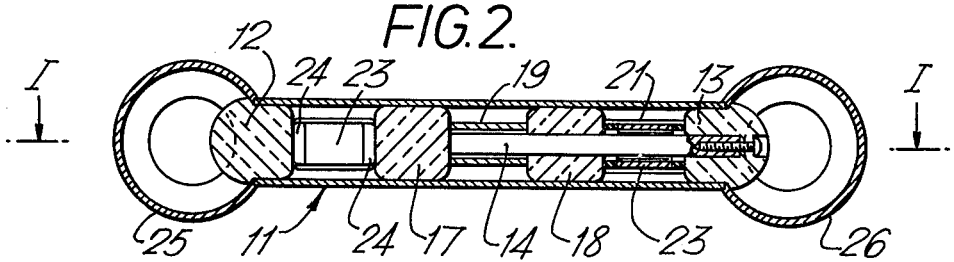
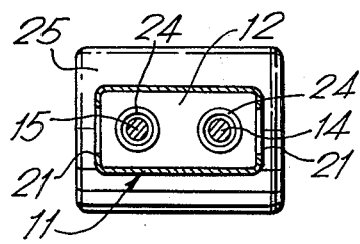

ELECTROSTATIC GENERATORS

The present invention relates to charge carrying conveyors as used in electrostatic generators, the purpose of such generators being to generate high voltages for the acceleration of charged particles in aid of nuclear structure research or for producing high energy rays for various applications in medical and industrial fields. More particularly, the invention is concerned with the type of charge conveyor which, besides being endless, is chargeable inductively. This implies that the conveyor comprises electrically conductive elements; such elements are linked together in an electrically insulated fashion so as to be successively and separately chargeable in passage through an induction charging zone.

In one of its aspects, the invention provides an endless charge carrying conveyor of the inductively chargeable type comprising a series of smooth uncovered electrically conductive elements, links for mechanically interconnecting the elements into an endless chain, and means for electrically insulating successive elements in the chain which means consists of electrically insulating material interposed in compression between the links and the elements at each link/element connection. Bearing in mind that electrically insulating material employed in high performance charge conveyors is vulnerable to spark impingement in addition to mechanical stressing and wear associated with its movement as an endless chain, the arrangement which subjects it to compressive force, rather than tensile force, during operation can be expected to give enhanced reliability since electrically insulating materials (by which is meant solid materials in this context) will as a general rule have better compressive properties. This is especially true of plastics and ceramics among which there are several choices for providing the requisite stiffness, friction coefficient, insulating characteristic, and wear resistance.

Conveniently the electrically insulating material is lodged internally of each element in the manner of a plug, or part of a plug, and means for retaining the links are carried by this plug. An oversize slot or aperture will be needed in the wall of the element if the positions of the link lines in the endless chain so require.

A tubular construction of the elements facilitates manufacture and enables a given amount of chargeable surface area to be obtained with greater material economy. It also follows from the economy of material that the overall weight of the charge conveyor can be improved in the sense of reducing the weight per unit of chargeable surface area. The latter factor is important for economy of power consumption in driving the conveyor and for reducing vibrational tendencies when travelling at speed. To impart extra rigidity and mechanical strength to a thin tubular section, the hollow interior may be filled at least at selected parts of the length, with a different material which is preferably of lower density.

With the elements arranged in side by side relationship transversely of the chain length, the shape of the tubular section preferably affords a high proportion of flat surface in the plane of travel of the conveyor so that in conjunction flat induction electrodes constituting an induction charging zone the amount of surface passing the electrodes with uniform close clearance is maximised. Assuming the provision of electrodes on both sides of the conveyor, the tubular shape is advantageously composed for the most part of fairly closely adjacent parallel sides and, although the shape will then approximate a rectangle with one pair of faces having much larger width than the other pair, the narrow width faces may be rounded or given an outer convexity so that the resultant section may be likened to a cylindrical tube which has been flattened to such an extent that the cylindical curvature remains only over opposite short lengths of the perimeter.

The invention will be further described with reference to the example which is illustrated in the accompanying drawings in which:

FIG. 1 is an elevation, partly sectioned, of part of a charge carrying conveyor embodying the invention, the section being taken on the line I—I of FIG. 2, FIG. 2 is a section taken on the line II—II of FIG. 1, and FIG. 3 is a section taken on the line III—III of FIG. 1.

As appearing in the drawings, each element comprises a tubular metal shell designated generally 11. These elements are arranged side by side in parallel relationship and are linked together to form an endless chain. With particular reference to FIG. 1, the resemblance to a caterpillar track or wrist watch bracelet will be appreciated.

The tubular section of the metal shell is rectangular, with rounded corners, as best seen in FIG. 3, and this section extends uniformly over the whole length of the shell. The metal may be stainless steel but is preferably of aluminium or an aluminium alloy for lightness. The large width faces of the section are about double the width of the narrow width faces (FIG. 3).

Inserted into each of the open ends of the shell are plugs 12 and 13 of an electrically insulating material. These plugs are held fast by a pair of tie rods, 14 and 15, which extend lengthwise inside the shell on axes parallel to the large and narrow width faces. The tie rods are secured to the plugs by screws, such as 16, and intermediate support is provided by blocks 17 and 18 of electrically insulating material which are maintained in position by spacer sleeves 19 and 20 carried on the tie rods.

The arrangement as so far described allows spaces on the tie rods between each of the plugs 12 and 13 and the respectively adjacent insulating block 17 or 18. Aligned with these spaces are apertures, such as 21, in the narrow width faces of the element shells, such apertures permitting projection into the shell interior of the links which form the elements into a chain. There are two link lines equispaced from the element extremities and consequently each element has a symmetrical arrangement of four apertures, each identical with that indicated at 21. Each link, such as that indicated at 22, is constituted by a short rectangular section bar with identical journals, such as 23, at both ends, each such journal being provided with a bearing sleeve. These journals enable pivotal mounting of the links on the tie rods washers 24 of insulating material, preferably nylon, being interposed between each journal and both the plug 12 or 13, on the one hand, and the block 17 or 18 on the other hand.

It will be appreciated that the pivotal connection of the links on the tie rods provides the articulation which is necessary in the chain, the apertures such as 21, in the narrow width faces of the element shells being appropriately over-size on the section of the links in order not only to allow for the requisite articulation but to leave, even at maximum operating flexure, an adequate gap for maintenance of electrical isolation of each element from its neighbours.

It will be further appreciated that the electrical insulating material by which the electrical isolation is established is arranged to take the operational loading in compression, the tie rods and links being of metal, preferably stainless steel. This also implies metal-to-metal bearings with the advantage of less deterioration due to electrical discharges than if an insulator were to form one of the bearing surfaces. For the insulating plugs and blocks a suitable insulating material may be found in the group consisting of polycarbonate, nylon, moulded glass and dense ceramics. Particularly in the case of ceramics, the compressive loading feature will give greater confidence in their selection.

For driving the charge-carrying conveyor there is fitted at each end of each element shell a drive engaging appendage which in the illustrated embodiment takes the form of a cylindrical spool, 25 or 26. The cylinder axis of the spools is normal to the lengthwise axis of the metal shells so as to given alignment with co-operating driving pulleys (not shown). The spools are hollow, and open-ended, for lightness and fixing to the shells is accomplished by interposition of a lip such as 27 between the end edge of the shell and a flange 28 on the respective plug 25 or 26.

The manner in which a charge carrying conveyor as illustrated is installed in combustion with a high voltage terminal in an electrostatic generator is described in U.S. Pat. specification Ser. No. 3,842,293. The arrangement as therein described involes lapping the conveyor around pulley pairs, each pair of pulleys being on parallel axes and one pair being driven while the other pair is idle. Charging and discharging stations, the latter acting to draw charge from the conveyor to the high voltage terminal, are constituted by induction electrodes which are disposed with uniform close clearance relative to the conveyor in a manner spanning the full extent on both sides of the elements of the large width faces, the electrodes operative on the rear faces being situated between the individual pulleys of each. In the case where the drive engaging appendages 25 and 26 are of metal, an appropriate choice being stainless steel, some supplementary induction effect is obtainable by extending the electrodes confronting the front faces of the elements so as to embrace some part of the spools which form the drive engaging appendages, again with the some uniform close clearance.

It lies within the scope of the invention to introduce a positive drive in place of the frictional drive represented by the engagement of the bosses 25 and 26 in V grooves of the co-operation pulleys and to this end the drive engaging appendages may take a wide variety of forms and in particular may be provided with recesses which are suitably shaped for co-operation with a toothed form of rotary member.

I claim:

1. For an electrostatic generator, an endless charge carrying conveyor of the inductively chargeable type comprising a series of smooth uncovered electrically conductive elements, links for mechanically interconnecting the elements into an endless chain, and means for electrically insulating successive elements in the chain, said means comprising electrically insulating material interposed in compression between the links and the elements at each connection therebetween.

2. A charge carrying conveyor according to claim 1 in which each link projects at one end through an oversize aperture in the associated element which is hollow in the region of the aperture, a link retaining means is provided at the inwardly projecting end of the link, and the electrically insulating material is disposed within the hollow interior of the element and is engaged on the one hand against the inside surface of the element in the region of the aperture and on the other hand, more inwardly of the element, by the link retaining means so that tension in the conveyor is borne in compression by the insulating material.

3. A charge carrying conveyor according to claim 2 in which each link retaining means is adapted to permit pivotal motion of the respective link whereby chain articulation is obtained at the connections between the links and elements.

4. A charge carrying conveyor according to claim 3 in which the elements are elongated and lie in side by side parallel relationship transversely of the chain length in a manner analogous to a caterpillar track, each element being tubular and having spaced apart plugs of the insulating material fitted in the tubular interior together with tie rod means extending between and carried by the plugs to act as the link retaining means.

5. A charge carrying conveyor according to claim 4 in which the elements have a tubular section approximating to a rectangle with rounded corners so as to provide large width faces in the plane of travel of the conveyor and narrow width faces which on neighbouring elements in the chain oppose each other, there being two lines of links equispaced from the extremities of the elements and such links projecting through apertures in the elements which are formed in the narrow width faces.

6. A charge carrying conveyor according to claim 5 in which drive engaging appendages are fitted at each of the extremities of each element, the tubular section of each element being uniform over the entire length extending between these appendages.

7. An electrostatic generator comprising a high voltage terminal, a series of smooth uncovered electrically conductive elements of tubular elongated form by which charge is conveyed to the terminal, links for mechanically interconnecting the elements in side by side parallel relationship to form an endless chain analogous to a caterpillar track, spaced apart plugs of electrically insulating material fitted in the tubular interior of each element, tie rod means extending between and carried by the plugs and having pivotally connected thereto ends of the links which project through oversize apertures in the elements, a charging station and a discharging station of which both comprise induction electrode means disposed on both sides of the elongated elements, the discharging station being arranged for the transfer of charge from the elements to the high voltage terminal, and means for driving the endless chain along a path of travel from the charging station to the discharging station.

8. An electrostatic generator according to claim 7 in which drive engaging appendages are fitted at each of the extremities of each element and the driving means comprises spaced apart driving members engageable with the element appendages.

\* \* \* \* \*